Figure 1:
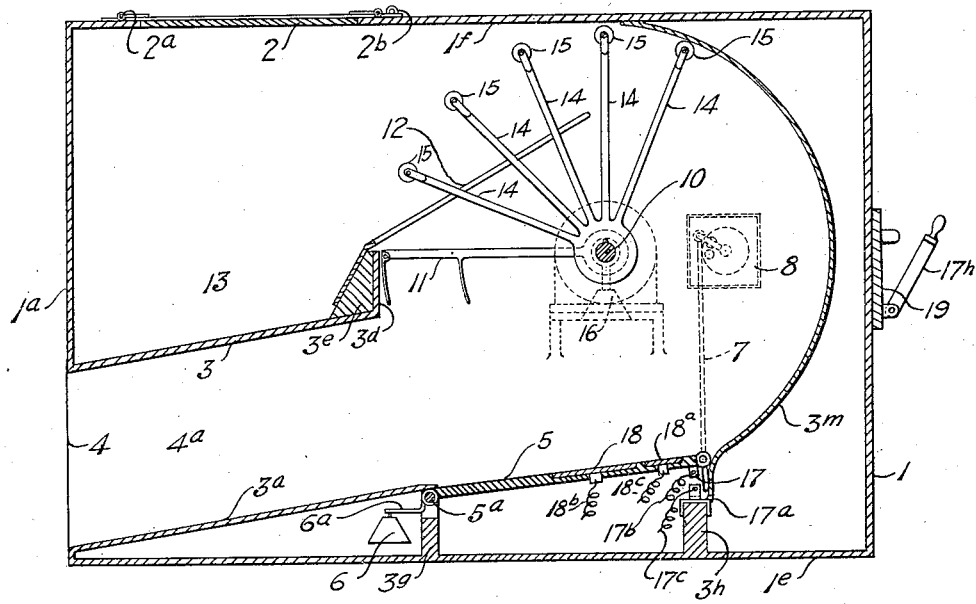

R. H. PRYOR.
ELECTRIC TRAP.
APPLICATION FILED APR. 21, 1911.

1,052,957.

Patented Feb. 11, 1913.

2 SHEETS—SHEET 1.

WITNESSES:

INVENTOR.
R. H. PRYOR.
BY
ATTORNEYS.

R. H. PRYOR.
ELECTRIC TRAP.
APPLICATION FILED APR. 21, 1911.

1,052,957.

Patented Feb. 11, 1913.
2 SHEETS—SHEET 2.

WITNESSES:

INVENTOR.
R. H. PRYOR
BY
ATTORNEYS.

UNITED STATES PATENT OFFICE.

RAYMOND H. PRYOR, OF PITTSBURGH, PENNSYLVANIA, ASSIGNOR OF ONE-HALF TO HENRY CARTER, OF PITTSBURGH, PENNSYLVANIA.

ELECTRIC TRAP.

1,052,957.  Specification of Letters Patent.  Patented Feb. 11, 1913.

Application filed April 21, 1911. Serial No. 622,511.

*To all whom it may concern:*

Be it known that I, RAYMOND H. PRYOR, a citizen of the United States of America, residing at Pittsburgh, in the county of Allegheny and State of Pennsylvania, have invented certain new and useful Improvements in Electric Traps, of which the following is a specification, reference being had therein to the accompanying drawing.
This invention relates to an electric trap for exterminating rats or other rodents by the use of electricity and has for its object to provide a trap of such class in a manner as hereinafter set forth which can be safely employed by the public; which can be operated with a minimum amount of current; which can be conveniently connected when desired with the electric circuit of an office building, and which is so set up that after the animal has been electrocuted, it can be conveniently removed from the casing of the trap.

With the foregoing and other objects in view, the invention consists of the novel construction, combination and arrangement of parts as hereinafter more specifically described and illustrated in the accompanying drawings wherein is shown the preferred embodiment of the invention, but it is to be understood that changes, variations and modifications can be resorted to which come within the scope of the claims hereunto appended.

Figure 2:
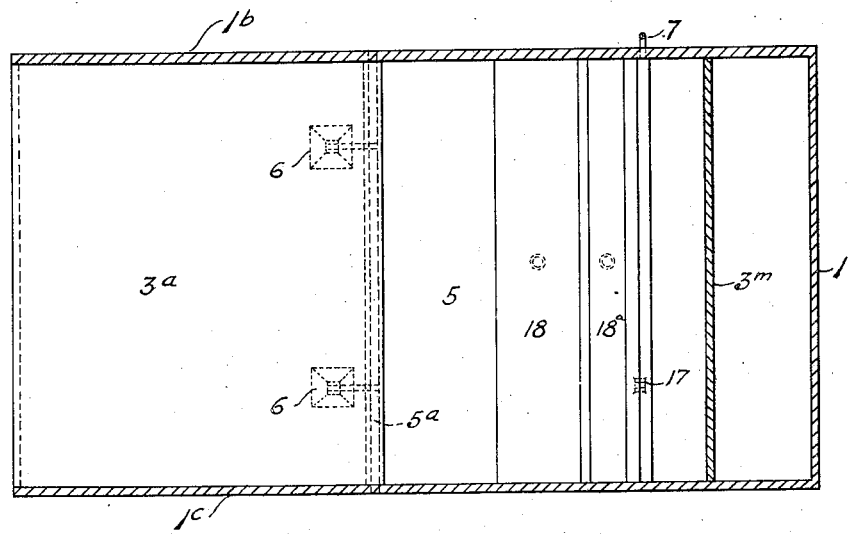
Figure 3:
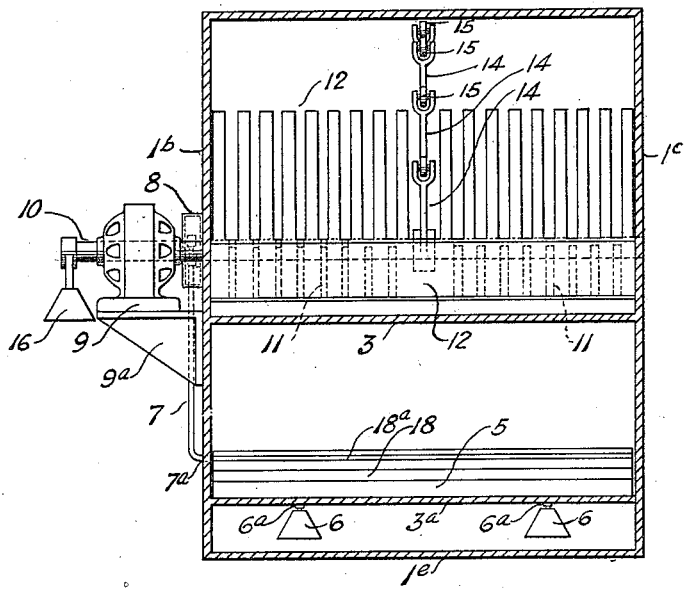
Figure 4:
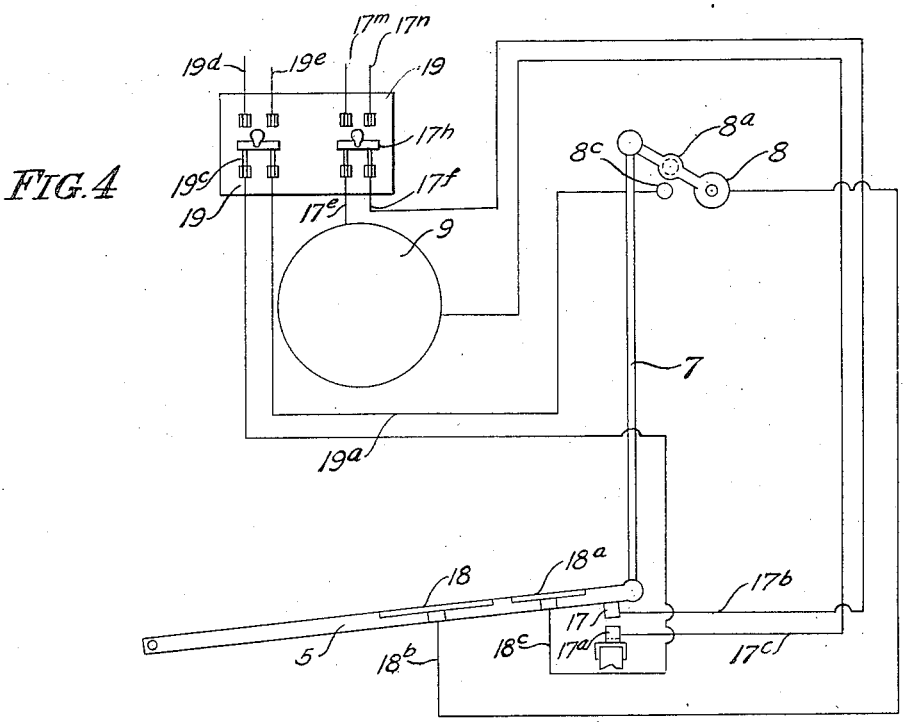

In describing the invention in detail, reference is had to the accompanying drawings wherein like reference characters denote corresponding parts throughout the several views and in which:

Figure 1 is a longitudinal sectional view of the trap. Fig. 2 is a horizontal section. Fig. 3 is a cross-section, and, Fig. 4 is a diagrammatic view illustrating the electric wiring.

The trap comprises a rectangular casing including end walls 1, 1ª, side walls 1ᵇ, 1ᶜ and bottom 1ᵉ, and a top 1ᶠ. The top is formed with an opening closed through the medium of a door 2 which is hinged as at 2ª and also connected to the top 1ᶠ by a hasp and staple 2ᵇ. The opening which is closed by the door 2 permits access to be had to the casing to enable the convenient removal of the rodent after it has been electrocuted.

Arranged within the casing 1 are a pair of spaced partitions 3, 3ª which extend from the end wall 1ª to near half the length of the casing 1. The partitions 3, 3ª are of a width equal to the width of the casing 1 and provide a passage for the rat to enter the trap. The end wall 1ª is formed with an opening 4 which communicates with the passage 4ª formed by the partitions 3, 3ª, these latter extending inwardly and upwardly at an inclination. The inner end of the partition 3 is formed with a vertically-extending portion 3ᵈ which is secured to a transversely-extending support 3ᵉ attached to the side walls 1ᵇ, 1ᶜ of the casing 1. The inner end of the partition 3ª is mounted upon a transversely-extending support 3ᵍ carried by the bottom 1ᵉ. The outer ends of the partitions 3, 3ª are connected to the end wall 1ª.

Extending parallel with the support 3ᵍ and arranged in proximity to the end wall 1 is a transversely-extending support 3ʰ which has the lower end of a curved partition 3ᵐ supported thereon. The partition 3ᵐ extends to the top 1ᶠ of the casing.

Pivotally-connected as at 5ª to the support 3ᵍ and extending toward the support 3ʰ is an inclined pivoted platform 5 normally maintained in position through the medium of the weights 6 which are connected with the platform 5 by the hangers 6ª. When the rodent walks on to the platform 5, it is lowered and through the medium of a construction hereinafter set forth the rodent is electrocuted and removed from the platform.

Projecting laterally from the end wall 1ᵇ is a supporting bracket 9ª upon which is mounted an electric motor 9 having the shaft 10 thereof extended and journaled in the side walls 1ᵇ, 1ᶜ. The shaft 10 is provided with a pronged scoop 11 which is arranged within the casing and which is adapted to scoop up the rodent after being electrocuted and to deposit the same upon the inclined chute 12. The rodent after being deposited upon the inclined platform 12 will slide down into the chamber 13 formed by the partition 3 in connection with one end wall, the side walls and the top and bottom of the casing. The opening closed by the door 2 permits of access being had to the chamber 13 so that the electrocuted rodent can be removed. The shaft 10 is provided with a series of arms 14, each having its outer end provided with a roller 15, the arms being of a length to cause the rollers 15 to retain the platform 5 depressed while the rollers traverse the surface of the platform, these arms moving with the shaft 10.

The platform 5 has depending therefrom a contact 17 which when the platform 5 is lowered by the weight of the rodent engages with the contact 17ª upon the support 3ʰ. A circuit wire 17ᵇ leads to the contact 17 and the circuit wire 17ᶜ leads to the contact 17ª. The wires 17ᵇ and 17ᶜ are in circuit with the motor 9. Circuit wires 17ᵉ and 17ᶠ form leads for the motor 9 and its circuit through the switch 17ʰ, the latter being connected to a source of electrical energy by the wires 17ᵐ and 17ⁿ. The platform 5 is provided with a pair of metallic plates 18, 18ª, the former being electrically connected to a circuit wire 18ᵇ and the latter to a circuit wire 18ᶜ. The wire 18ᵇ leads to a pivoted switch arm 8 provided with a contact 8ª adapted to be brought into engagement with the contact 8ᶜ, to which is connected a wire 19ª, the wires 19ª and 18ᶜ being connected to a switch 19ᶜ connected to a source of electrical energy through leads 19ᵈ and 19ᵉ. The switch arm 8 (which forms a make and break device) is shifted through the medium of a lever arm 7 which at its upper end is connected to the free end of the arm 8 and at its lower end is attached to the platform 5 and by such an arrangement, it is obvious that when the weight of the rodent lowers the platform 5, the switch arm 8 will be shifted to close what may be termed the electrocuting circuit and further that what may be termed the motor circuit is also closed through the contacts 17 and 17ª actuating the motor and operating the scoop. The switches 17ʰ and 19ᶜ are mounted upon the base plate 19 and are secured to the end wall 1 of the receptacle.

The platform 5 is formed with an extension 7ª which projects from the side wall 1ᵇ and it is to this extension that the lever arm 7 is attached, said arm 7 being arranged exteriorly of the casing.

From the foregoing arrangement and construction of parts, it is obvious that if the rodent travels through the passage 4ª and upon the platform 5, the weight of the rodent will lower the door thereby closing the electrocuting circuit and also the motor circuit. The rodent will be electrocuted due to the closing of the electrocuting circuit and as the motor circuit is closed, the motor will be operated, moving the scoop to pick up the rodent from off the platform 5 and depositing the rodent upon the chute 12 from where it will be discharged into the chamber 13. As the movement of the rodent from the platform would affect the motor circuit, the traveling arms 14 act to retain the platform depressed until the scoop has passed to a position where the rodent will be discharged onto the chute 12.

What I claim is:

1. In an electric trap, a counter-poised pivoted platform carrying contact plates insulated from each other and the platform and forming terminals of an electrocuting circuit, circuit connections leading to said contact plates, said connections including a make and break device operated by the movements of the platform, a motor circuit including a make and break device controlled by the movements of the platform, a motor in said circuit, and clearing mechanism operated by said motor while the platform is depressed.

2. In an electric trap, a counter-poised pivoted platform carrying contact plates insulated from each other and the platform and forming terminals of an electrocuting circuit, circuit connections leading to said contact plates, said connections including a make and break device operated by the movements of the platform and independent of the electrocuting circuit, a motor in said circuit, and clearing mechanism operated by said motor while the platform is depressed.

3. In an electric trap, a counter-poised pivoted platform carrying contact plates insulated from each other and the platform and forming terminals of an electrocuting circuit, circuit connections leading to said contact plates, said connections including a make and break device operated by the movements of the platform, a motor circuit including a make and break device controlled by the movements of the platform, a motor in said circuit, and clearing mechanism operated by said motor while the platform is depressed, said mechanism including a shaft and a member carried thereby adapted to retain the motor circuit active to carry the rodent away from the platform.

In testimony whereof I affix my signature in the presence of two witnesses.

RAYMOND H. PRYOR.

Witnesses:
MAX H. SROLOVITZ,
CHRISTINA T. HOOD.